Feb. 8, 1955  E. J. GRIFFITHS  2,701,644
FILTER WITH MEDIUM SUPPORTED BY SUCTION PIPING
Filed March 7, 1952
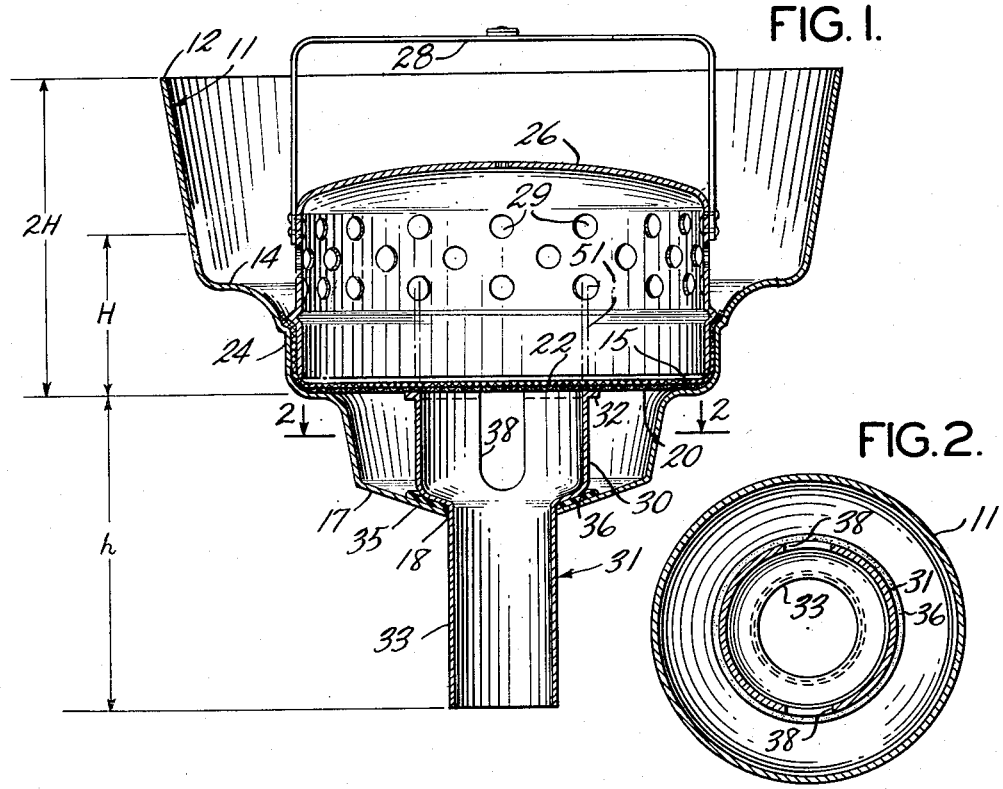
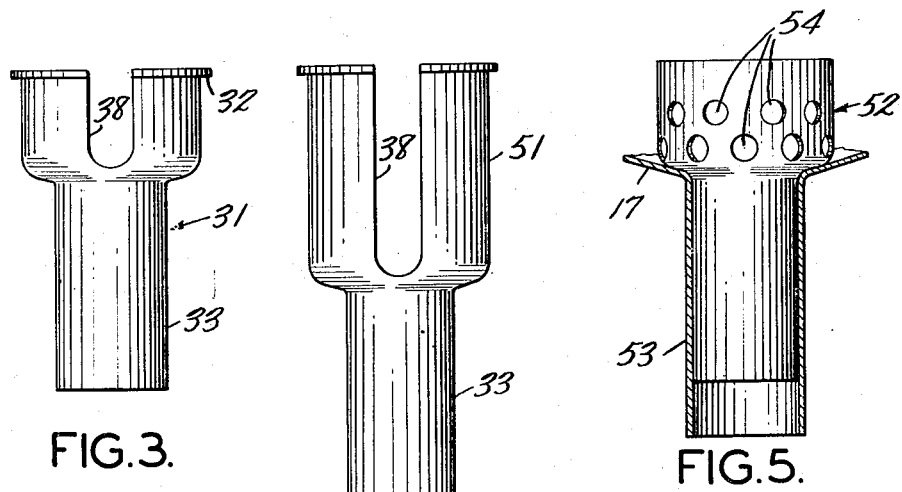
FIG.3.   FIG.4.   FIG.5.
INVENTOR
Edgar J. Griffiths
BY Emery Varney
Whittemore & Dix
ATTORNEY

United States Patent Office 2,701,644
Patented Feb. 8, 1955

2,701,644

FILTER WITH MEDIUM SUPPORTED BY SUCTION PIPING

Edgar J. Griffiths, Pittsburgh, Pa.

Application March 7, 1952, Serial No. 275,430

1 Claim. (Cl. 210—159)

This invention relates to filters which comprise funnels having filter elements therein and with discharge spouts that serve as suction pipes to increase the flow of liquid through the filter elements.

It is an object of this invention to provide an improved filter of the class wherein replaceable filter elements are removably held in the funnel by clamping means. It is a more particular object of the invention to provide a filter of the class indicated wherein the peripheral portion of the filter element is supported by a step, or otherwise from the wall of a funnel, and the mid-portion of the filter element is supported by an upward extension of a spout, preferably a removable spout that extends through the bottom of the filter.

In the preferred embodiment of the invention, the funnel has means for selectively supporting filter elements of different diameter at different levels in the funnel, and the removable spout that supports either of the filter elements can be replaced with another removable spout that is of a different height for supporting the other filter element.

In any filter having a discharge spout below the filter, the flow of liquid through the spout acts as a siphon to produce a "suction head" beneath the filter when the flow through the spout is greater than or equal to the flow through the filter element under the combined pressure and "suction" heads.

Another object of the invention is to provide a funnel-and-spout filter having an improved relation between the cross section of the discharge spout and the open area of the filter element so as to obtain the maximum practical advantage of the suction provided by the discharge spout without having the flow through the spout so small that it unduly restricts the flow through the funnel when the filter is clean.

Other objects, features and advantages of the invention will appear or be pointed out as the description proceeds.

In the drawing, forming a part hereof, in which like reference characters indicate corresponding parts in all the views, Figure 1 is a vertical view, mostly in section, showing a filter made in accordance with this invention and having steps at different levels for selectively supporting different size filter elements at different levels, Figure 2 is a sectional view taken on the line 2—2 of Figure 1, Figure 3 is a vertical elevation of the removable spout of the filter shown in Figure 1, Figure 4 is a side elevation of another removable spout, similar to that shown in Fig. 3 but long enough to support a filter element at the upper level of the funnel of Fig. 1, Figure 5 is a sectional view through the lower end of a modified funnel in which the removable spout extends into another spout that is permanently connected to the lower end of the funnel.

The filter shown in Fig. 1 includes a funnel which is preferably of circular cross section with a side wall 11 having an upper edge 12 and having two shoulders comprising steps 14 and 15 at different levels spaced along the longitudinal axis of the funnel. The funnel has a bottom 17 which is preferably of one-piece construction with the side wall 11, and this bottom extends downwardly with a moderate slope. There is an opening 18 at the center of the bottom 12, the axis of the opening 18 being coincident with the axis of the funnel.

A filter holder shown in the drawing includes a screen 20 that extends across the funnel and that is supported by the shoulder 15. A cloth filter element 22 rests upon the top of the screen 20 and has its peripheral edge portions turned upwardly along cylindrical sections 24 of the side wall 11. The lower edge of a dome 26 presses the peripheral edge portions of the cloth filter element 22 firmly against the cylindrical portions 24 of the side wall. The construction can be made with portions 24 of the side walls sloping outwardly at a slight angle toward their upper ends, but it is a feature of the invention that the portions of the side walls immediately above the shoulder 15 are either cylindrical or slope at such a slight angle that the lower edge of the dome 26 is securely held in position by its radial pressure against the adjacent portion of the side wall. In the construction shown, there is a handle 28 on the upper part of the dome for moving the dome into and out of position. It is important to have the dome 26, or whatever other means holds the filter element, conveniently removable because the filter elements are ordinarily replaced each time that the filter is used. There are openings 29 in the dome 26 for the flow of liquid into the space under the dome and above the filter element.

For filters where the strain on the filter element is not severe, the screen 20 may be dispensed with. The dome protects the filter element from direct impact by the falling stream of liquid poured into the funnel. The filter element 22, and the screen 20, if the screen is used, are supported at their mid-portions by the top rim of a cup 30 which comprises the upper part of a removable spout 31. A flange 32 is provided at the top of the removable spout 31 for service where the cloth filter element is to rest directly upon the upper rim of the cup 30.

The removable discharge spout 31 has a reduced diameter lower portion 33 which extends through the opening 18 and downward for a substantial distance below the bottom 18 of the funnel. A stronger suction head is created by the siphon action if the reduced diameter portion 33 of the spout is made longer, but there is nothing to be gained by having this lower portion 33 so long that it extends into the contents of the can or other receptacle into which liquid is being poured, and excessively long spouts are also objectionable because of difficulty in handling and liability to injury. The lower portion 33 of the discharge spout may taper to a slightly smaller diameter at its lower end, but it is preferably cylindrical since that shape is more economical for manufacture.

At the intermediate region where the cup portion 30 merges with the reduced diameter portion 33 of the removable discharge spout 31, there is a shoulder 35. This shoulder limits the extent to which the discharge spout 31 can be inserted through the opening 18, and supports the discharge spout in a predetermined position in the funnel. In the preferred construction there is a gasket 36, which is made of rubber or other soft material, located between the shoulder 35 and the top surface of the funnel bottom 17. This washer or gasket 33 seals the funnel against the leakage of liquid between the funnel bottom 17 and the outside surface of the removable discharge spout 31.

In order to permit liquid in the funnel below the filter element 22 to drain into the discharge spout 31, there are slots 38 extending downward from the flange 32 to the level of the gasket 35. It will be evident that these slots are merely representative of openings through the upper portion 30 of the discharge spout, and while these openings should extend downward to the level of the washer or gasket 36 for best results, it is not necessary that they extend to the upper end of the discharge spout provided that the total cross section of the openings 38 is at least as great, and preferably greater than the cross section of the opening through the lower portion 33 of the discharge spout.

When the funnel is to be used for filtering a substantial quantity of material, especially milk, which clogs the filter elements quite rapidly, it is preferable to use a larger filter element so that it will not be necessary to stop and change filter elements during the operation. With this invention, a larger filter element can be placed in the funnel and supported by the step 14.

When a funnel is to be used with the larger filter element at the upper step 14, the removable discharge spout 31 is removed and another discharge spout 51 is inserted in its place. The only difference between the discharge spout 51 and the shorter discharge spout 31, is that the discharge spout 51 extends upward to the level of a filter element at the upper step 14. In describing the discharge spouts 31 and 51 as extending upwardly to substantially the same level as the steps 15 and 14, it should be understood that the upper ends of these discharge spouts can support the filter elements with a slight sag in the filter elements, and for some purposes it is preferable to have the discharge spouts 31 and 51 slightly lower than the steps so that the filter element is concave and liquid tends to run from the edges toward the center portion. The upper ends of the removable discharge spouts 31 and 51 are substantially at the level of the steps, therefore, when they are located in position to support the filter elements with the elements either flat or slightly convex or concave depending upon the surface contour that the filter manufacturer considers most desirable for the particular use to which the filter is intended to be put.

Fig. 5 shows a modified construction in which a removable discharge spout 52 extends into a permanent discharge spout 53 which is preferably of one-piece construction with the funnel bottom 17. The spout 52 differs from the discharge spout 31, previously described, in that it has no flange on its upper edge, and in place of slots in the walls of the spout, there are a plurality of holes 54 in the side wall of the upper portion of the spout 52. These holes 54 are preferable to slots when the thickness or nature of the material used for the spout 52 makes it difficult to mill slots in the wall without deforming the walls. The holes 54 of the lower row are approximately level with the bottom 17 of the funnel and their combined cross-section is at least as great as the area of the cross-section of the spout 52.

When the filter is used with a clean cloth filter element, the liquid pours through the filter more rapidly than it drains through the discharge spout 31 and some liquid accumulates in the space between the filter element and the funnel bottom 17. If the discharge spout 31 is too small, this space between the filter element and funnel bottom will become completely filled in a short time and further flow of liquid through the filter element will be slower because the drainage through the discharge spout 31 is slower than the rate at which liquid can flow through the clean filter element 22.

On the other hand it is not desirable to make the discharge spout 31 too large in cross section because after the filter element 22 has become partially clogged the flow of liquid through the discharge opening 33 is at a rate equal to or slightly greater than the normal flow through the filter element. This causes the liquid to flow through the partially clogged filter element more rapidly, because the "suction head" created by the siphon effect is equivalent to providing more pressure on the supply side of the filter element. If the discharge spout 31 is too large in diameter, it will create this siphon effect for only a very short time because the siphon will break as soon as the liquid discharge through the spout 31 is no longer sufficient to completely fill the cross section of the discharge spout.

Experience has shown that for practical purposes it is desirable to have the discharge spout 31 maintain a siphon action or "suction head" until the filter element 22 has partially clogged to the extent that it has only about half of the open area that it originally had when clean. It is not usually practical to continue the use of filter elements beyond this point because the flow through them becomes too slow and this results in excessive loss of time for the person using the filter. In order to obtain a continued siphon action for the period indicated, the open area of the clean filter should have a ratio to the minimum cross section of the discharge spout 31 that is greater than $$\sqrt{\frac{h}{H}}$$

where $h$ is the distance from the filter element to the bottom of the discharge spout, that is, the maximum suction head; and $H$ is half the distance from the filter element to the top of the funnel. This latter distance is the average level of the liquid above the filter element when the funnel is being used to fill a container into which it is inserted. Another relation that should also exist is that one-half of the ratio of the open area of the clean filter to the minimum cross section of the discharge opening through the spout should be less than $$\sqrt{\frac{h}{H+h}}$$

If these two relations exist, the siphon action of the discharge spout persists until the filter element is substantially half clogged, and yet the rate of discharge through the spout does not unreasonably restrict the initial flow through the filter when the filter element is clean.

The desired relationship between the filter element and the cross section of the opening through the discharge spout can also be expressed by the equation $$2a = A\sqrt{\frac{H+h}{h}}$$

where $A$ is the effective open area of the clean filter element; $a$ is the minimum cross section of the opening through the discharge spout.

The preferred embodiment of the invention has been illustrated and described but changes and modifications can be made and some features can be used in different combinations without departing from the invention as defined in the claim.

What is claimed is:

A filter comprising a funnel having a side wall that decreases in diameter from its upper to its lower end, a step in the side wall at an intermediate level, the side wall immediately above said step being substantially parallel to the longitudinal axis of the funnel, a bottom for the funnel integral with the lower end of the side wall and sloping downwardly to a central discharge opening, the center of which is coincident with the axis of the funnel, a filter cloth extending across the funnel at the level of the shoulder and having its peripheral edge portion extending upwardly from the shoulder along the portion of the side wall immediately above the shoulder, a dome having a lower edge that clamps the filter cloth firmly against the side wall of the funnel to secure the filter cloth in position, said dome having openings therethrough near its lower edge, a removable spout having a reduced diameter portion that extends through and below the opening in the bottom of the funnel and that fits freely through said opening, an annular gasket that surrounds the reduced diameter portion of the removable spout and that rests on the inside surface of the bottom of the funnel immediately around the opening through which the removable spout extends, a shoulder on the removable spout in contact with the upper surface of the gasket, and an upwardly extending portion of the removable spout comprising a cup having the diameter of the outer periphery of the shoulder, a flange at the upper end of the cup and at substantially the level of the filter cloth and extending parallel to the filter cloth to support the mid-portion of the cloth, said cup having slots in its side wall extending from the flange downwardly to the region of the shoulder and of a total open area as great as the minimum cross section of the inside of the spout for drainage of liquid from the space in the funnel between the filter cloth and the bottom of the funnel.

References Cited in the file of this patent

UNITED STATES PATENTS

| Number | Name | Date |
|---|---|---|
| 807,547 | Fliegel | Dec. 19, 1905 |
| 2,273,927 | Brant | Feb. 24, 1942 |
| 2,336,348 | Demers | Dec. 7, 1943 |
| 2,410,010 | Brant | Oct. 29, 1946 |
| 2,465,623 | Zika | Mar. 29, 1949 |
| 2,483,000 | Brant | Sept. 27, 1949 |